US007651867B2

(12) United States Patent
Eden

(10) Patent No.: US 7,651,867 B2
(45) Date of Patent: Jan. 26, 2010

(54) METHOD OF MAKING A TEST DEVICE

(76) Inventor: Gideon Eden, 2765 Ember Way, Ann Arbor, MI (US) 48104

( * ) Notice: Subject to any disclaimer, the term of this patent is extended or adjusted under 35 U.S.C. 154(b) by 405 days.

(21) Appl. No.: 11/758,327

(22) Filed: Jun. 5, 2007

(65) Prior Publication Data

US 2008/0305013 A1 Dec. 11, 2008

(51) Int. Cl.
*G01N 1/10* (2006.01)

(52) U.S. Cl. ......................... 436/180; 422/99; 422/100; 422/101; 435/297.1; 435/297.5; 436/89; 436/174; 73/863.11

(58) Field of Classification Search ................... 436/89, 436/174, 180; 422/99–101; 435/297.1, 297.5; 73/863.11
See application file for complete search history.

(56) References Cited

U.S. PATENT DOCUMENTS 5,162,235 A * 11/1992 Hardy et al. ................ 436/177
5,447,077 A * 9/1995 Lautenschlager ........ 73/863.11
6,051,439 A * 4/2000 Antonenko et al. ........... 506/30
6,338,802 B1 * 1/2002 Bodner et al. ............... 210/650

* cited by examiner

*Primary Examiner*—Jill Warden
*Assistant Examiner*—Jyoti Nagpaul
(74) *Attorney, Agent, or Firm*—Young Basile

(57) ABSTRACT

A method of making a test device comprised of a container divided into two chambers, each holding a volume of a clear test liquid, the chambers separated by a porous barrier. The liquid is introduced into the lower chamber by adding a liquid to the upper chamber through the open top of the container and then applying a vacuum to completely evacuate air from the lower chamber by drawing the air through the barrier and liquid in the upper chamber. Restoring air pressure forces liquid in the upper chamber into the lower chamber, to completely fill the same while leaving a volume of liquid in the upper chamber. The application of a vacuum is preferably carried out by placing the container with liquid in a receptacle containing a liquid to be boiled, heating the liquid to boil the same and thereafter condensing the vapor with the receptacle sealed to develop a very high vacuum which draws the air out from the lower chamber of the container. The boiling can be done with the receptacle sealed to develop a higher temperature and later vented prior to being resealed for cooling and condensing of the vaporized liquid to further enhance the level of vacuum achieved.

15 Claims, 1 Drawing Sheet

METHOD OF MAKING A TEST DEVICE

BACKGROUND OF THE INVENTION

In various chemical processes such as fermentation, it is desirable to monitor the progress of specific chemical reactions that take place in a test container. Most of these applications are long-term processes that can last between a few hours to several days. Typical applications include chemical reactions resulting from growth of microorganisms in liquefied samples. Under appropriate environmental conditions (e.g. temperature and adequate growth nutrients), microorganisms grow, metabolize, and chemically change the liquid growth medium that surrounds them. Several chemical indicators, such as dyes and fluorescent reagents may be added to the assay. These indicators are capable of changing their optical characteristics due to the chemical reaction taking place in the test container. For example Bromcresol Purple (Hach Co. Catalog #25432) can serve as a color PH indicator. When fermenting, the growing microorganisms lower the PH of the liquid medium (i.e. becoming more acidic), changing the color of the indicator from purple to yellow. The color variant can be detected with an external optical sensor that dynamically monitors and registers that change as a function of time.

In practical applications it is desirable to monitor actual product samples such as industrial samples (food, beverages, cosmetics, pharmaceuticals, etc.) or medical samples (blood, tissues, urine, etc.). These products can severely mask the optical readings of the indicators. Products such as milk, powders, and blood can interfere or totally alter the optical readings. Even for clear samples such as water, the growing organisms form turbidity in the solution that can also mask the corresponding optical readings.

In order to decrease the product interference, a two chamber test device has been devised, which includes a container having a first or upper chamber defined therein holding a clear test liquid which is open to allow the sample to be tested to be introduced therein, and also having a second or lower chamber defined therein below the upper chamber and also filled with a clear test liquid. The two chambers are separated by a porous barrier such as a membrane, which is configured so that the product as well as the microorganisms cannot penetrate through the porous barrier, while small molecules and ions can diffuse freely between the layers through the porous barrier and be in equilibrium. The color changes can therefore be read in the liquid in the second chamber by an external optical reader since the test liquid in that chamber remains relatively clear.

Both chambers enclose identical mixtures of growth media and optical indicators, which are in contact with both sides of the porous barrier.

The upper chamber of the container has an opening at the top to allow the introduction of a test sample into the container via its open top. The lower chamber serves as the detection zone in which the optical readings are monitored. The lower chamber's internal volume of liquid is completely confined between the container inside wall and the barrier.

Constructing such a test container presents substantial difficulties. The barrier layer must be fixedly attached about its perimeter to the interior of the container side walls at an intermediate level to define the upper and lower chambers. This can be accomplished by ultrasonic welding, heat welding or any other sealing-attachment process. The use of heat as an attachment method precludes the prior introduction of liquid into the lower or second chamber and other sealing-attachment methods would also be difficult to carry out if liquid was present in the second chamber. The liquid must completely fill the lower chamber, as the presence of any air would interfere with the diffusion process.

In order to completely fill the lower chamber with liquid, a hole can be made in the bottom of the container to allow the introduction of test liquid either through the porous barrier from the top or from the bottom through the hole itself. Achieving complete filling of the lower chamber is difficult. If any residual air is present only part of the liquid in the lower chamber can be in direct contact with the barrier layer, thereby reducing the efficiency of the diffusion of molecules between the two chambers. The hole must thereafter be reliably sealed, leading to manufacturing difficulties when produced in quantity due to the inevitable incidence of leaks in some of the devices.

An object of the present invention is to provide a method that substantially completely evacuates the air in the lower chamber and allows test liquid to completely fill the entire volume of the lower chamber in order to promote maximal diffusion between the lower chamber and upper chamber of a two chamber test container when a test sample is introduced to the upper chamber, so that monitoring can then be effectively carried out by optical monitoring of the lower chamber.

SUMMARY OF THE INVENTION

The above recited object and other objects which will become apparent upon a reading of the following specification and claims are achieved by the method according to the present invention comprising dividing a container having an opening at the top into upper and lower chambers by installing a porous barrier (such as a hydrophilic membrane) within the container at an intermediate level. A volume of clear test liquid sufficient to completely fill the lower chamber and to provide a volume of test liquid in the upper chamber sufficient to carry out a test is put into the upper chamber. A vacuum is then applied to the container upper chamber with liquid disposed therein to draw trapped air out of the lower chamber, through the barrier and the liquid in the upper chamber which acts as a seal preventing reentry of air. After the air in the lower chamber is removed, atmospheric pressure is restored above the upper chamber so that a portion of the liquid in the upper chamber is forced by atmospheric pressure into the lower chamber which will be under vacuum as a result of the complete evacuation of air therefrom to completely fill the lower chamber, leaving a volume of test liquid in the upper chamber. Test liquid could be added to the upper chamber as needed to complete the test device.

In a first embodiment, one or more test containers are placed in a receptacle with a liquid such as water which is boiled within the receptacle, which is vented to allow the escape of vapor. The receptacle is then cooled sufficiently while being sealed against atmospheric pressure to condense the vapor, which condensation develops a very high level of vacuum in the receptacle interior. After the air is drawn out of the lower chamber of the container, the receptacle is vented to restore atmospheric pressure, thereby forcing a portion of the liquid in the upper chamber into the lower chamber through the barrier sufficient to completely fill the lower chamber with test liquid.

In a second embodiment, the liquid in the receptacle is boiled while the receptacle is sealed to develop higher pressures and temperatures which is then vented. The receptacle is thereafter cooled while being sealed, which achieves an even higher vacuum in the receptacle after the vapor condenses, as the mass of vapor condensed in the receptacle is reduced.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1A:
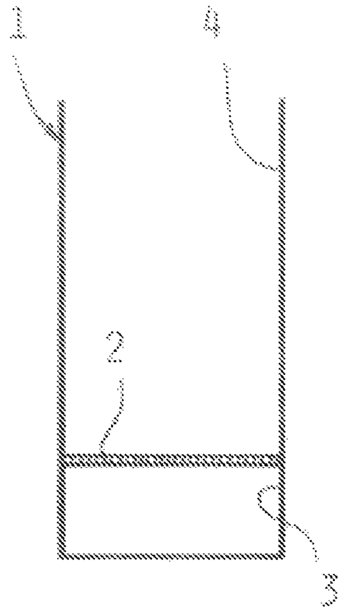
FIG. 1*a* is a diagrammatic side elevational view of a container to be used to produce a test device, having an upper and lower chamber defined therein.

Referring to FIG. 1*a*, a test device to be made according to the method of the present invention includes a container 1 having an opening at the top to allow the introduction of test liquid and samples. The container 1 may be tubular and made of any rigid material that can withstand temperatures above 120° C. For example a polymer such as polycarbonate can be molded to form the test container 1. A porous barrier 2, such as a hydrophilic membrane has its perimeter sealingly fixed to the inside wall of the container 1, at an intermediate level therein to define two distinct chambers in the container 1. A lower chamber 3 is located at the bottom of the test container 1, and an upper chamber 4 is located above lower chamber 3 and the porous barrier 2. The porous barrier 2 has a perimeter sealingly affixed to the inside wall of the container 1 by such processes as heat welding or ultrasound welding.

Figure 1B:
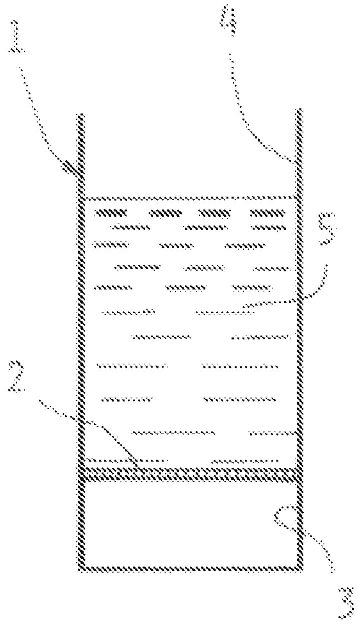
FIG. 1*b* is a diagrammatic side elevational view of the container shown in FIG. 1*a* after liquid has been added to the upper chamber defined therein in preparation for completing the evacuation of the lower chamber.
Figure 1C:
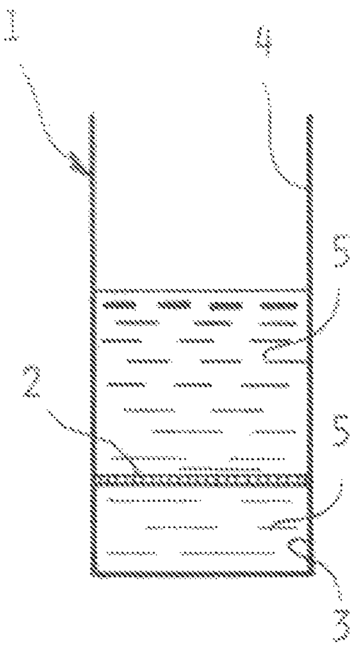
FIG. 1*c* diagrammatic side elevational view of the completed test device having test liquid in both the upper and lower chambers of the container.

During the manufacture of the test device, the lower chamber 3 of the container 1 is to be filled with clear liquid after the barrier 2 has already been installed but without forming a hole in the lower part of the container 1. However, if liquid 5 is poured into the upper chamber 4 (as illustrated in FIG. 1*b*), it cannot penetrate into the lower chamber since air at atmospheric pressure is trapped in the lower chamber 3.

Figure 2:
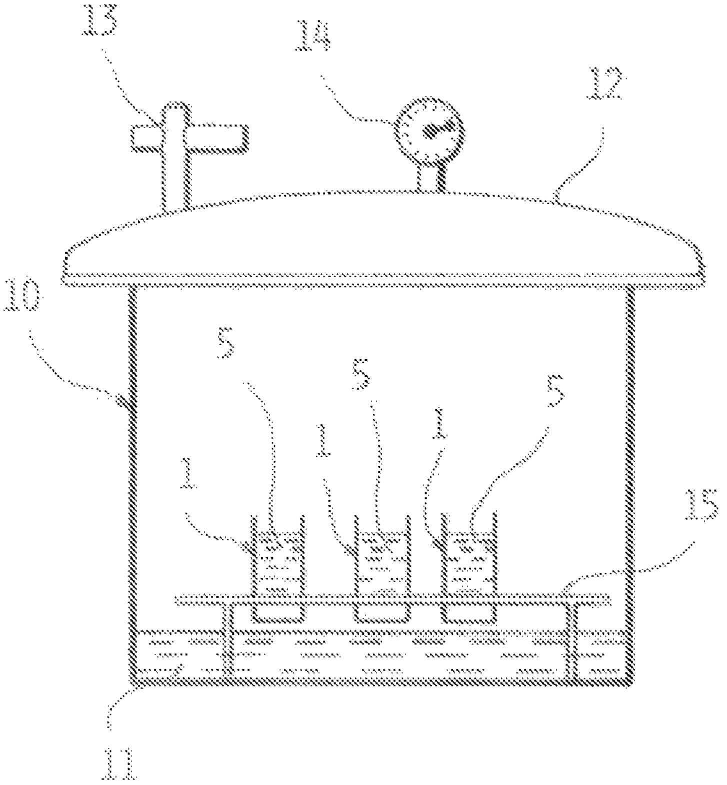
FIG. 2 is a diagrammatic side elevational sectional view of a receptacle having a liquid to be boiled added and enclosing several test containers held in a rack, in preparation for completing the method according to the invention.

A sealable receptacle 10 shown in FIG. 2, is used to substantially completely evacuate air from the lower chamber 3 according to the method of the invention. The sealable receptacle 10 can contain multiple test containers 1, placed on a rack 15, each having a volume of a test liquid 5 disposed in the upper chamber 4 thereof sufficient to completely fill the lower chamber 3 and while leave a volume of test liquid in the upper chamber 4. A small volume 11 of liquid such as water to be boiled fills the bottom part of the receptacle 10. A tightly sealable lid 12 includes a relief valve 13 and a pressure gauge 14 capable of measuring positive pressure and vacuum in the head space of the receptacle 10.

The receptacle 10 is sealed by the lid 12 while the valve 13 may be opened. The receptacle 10 is heated by either an external or an internal heater (not shown) until the liquid 11 boils to drive out air and leave only vapor of the liquid 11. The heater is then disabled and the valve 13 is closed, to seal the receptacle so as to prevent any atmospheric air from entering the receptacle while it cools. When the receptacle 10 is cooled sufficiently to condense the steam or other vapor into a liquid, a very high vacuum is developed in the head space of the receptacle 10 by the condensing of the vaporized liquid back into a liquid. This vacuum is applied to the upper chamber 4 of each test container 1 mounted on the rack 15. This causes all of the air in the lower chambers 3 to be drawn out through the porous barrier 2 and through the test liquid in the upper chamber 4, passing into the interior of the receptacle 10. After the receptacle 10 is cooled sufficiently so that the vapor is condensed and the evacuation of air from the lower chamber 3 is complete, the valve 13 is opened, allowing atmospheric air to reenter the receptacle 10. The atmospheric air pressure thus restored in the receptacle 10 forces a portion of the test change liquid 5 in the upper chamber 4 into the lower chamber 3, which initially still has a vacuum condition therein, the test liquid passing through the barrier 2 to fill the lower chamber 3.

Clear test liquid may then added to the upper chambers 4 needed to complete the test device and ready it for use.

The substantially complete absence of air in the liquid in the lower chamber 3 maximizes the rate of diffusion of the liquid and fluorescent dye or reagents from the product sample to be tested added to the liquid in the upper chamber 4 into the lower chamber 3.

The method described above can be further enhanced by boiling the liquid in the receptacle 10 while the valve 13 is closed temporarily to allow positive pressure to build up in the receptacle 10, thereby increasing the boiling point of the liquid, allowing a higher pressure to develop. When the heater is inactivated, the valve 13 is opened to allow steam or other vapor to flow out, reducing the pressure in the receptacle 10 to atmospheric pressure. The receptacle 10 is again sealed and cooled to condense the steam and cause a high vacuum to develop within the receptacle. This technique results in a higher vacuum to develop in the receptacle 10 after cooling due to a lower mass of steam being retained after venting at a higher pressure and temperature, enhancing the process of evacuating the air from the lower chamber 3.

The invention claimed is:

1. A method of making a two chamber test device comprised of a container having an opening at the top and divided into a lower chamber and an upper chamber by a porous barrier fixed between said upper and lower chambers, the method including:

sealingly affixing the perimeter of the porous barrier to the inside of said container at an intermediate level in said container;

loading a volume of test liquid into said upper chamber of said container sufficient to completely fill said lower chamber while leaving a volume of liquid in said upper chamber;

applying a vacuum to said upper chamber to draw out air in said lower chamber through said porous barrier and said liquid in said upper chamber so as to substantially completely evacuate said lower chamber;

thereafter applying pressure to said liquid in said upper chamber to force liquid in said upper chamber into said evacuated lower chamber to substantially completely fill the same with said test liquid, also disposed in said upper chamber.

2. The method of making a two chamber test device according to claim 1 wherein said vacuum is applied to said upper chamber by placing said container into a receptacle and developing a vacuum therein applied to said upper chamber.

3. The method of making a two chamber test device according to claim 2 wherein a vacuum is developed in said receptacle by boiling a liquid placed in said receptacle, venting said receptacle, and thereafter cooling the interior of said receptacle while said receptacle is sealed against the atmosphere to cause development of said vacuum therein by condensing of vapor from said boiled liquid in said receptacle.

4. The method of making a two chamber device according to claim 3 wherein said receptacle is initially sealed during boiling of said liquid to raise the boiling point due to an elevated pressure over atmospheric pressure in said receptacle and thereafter vented at a higher temperature and pressure prior to cooling of said receptacle with said receptacle sealed.

5. The test device made by the method of claim 4.

6. The method of making a two chamber device according to claim 3 wherein water is used as the liquid boiled in said receptacle.

7. The test device made by the method of claim 3.

8. The method of making a two chamber device according to claim 3 wherein said venting of said receptacle occurs during said boiling of said liquid in said upper chamber.

9. The test device made by the method of claim 8.

10. The method of making a two chamber test device according to claim 1 wherein said forcing of said liquid in said upper chamber into said lower chamber is produced by restoring atmospheric pressure in said receptacle after the air is drawn out of said lower chamber allowing said atmospheric pressure to force said liquid in said upper chamber into said lower chamber.

11. The test device made by the method of claim 10.

12. The method of making a two chamber device according to claim 1 wherein said barrier perimeter is sealingly affixed to said container interior by heat welding.

13. The method of making a two chamber device according to claim 1 wherein said barrier is a membrane.

14. The method of making a two chamber device according to claim 13 wherein said barrier is a hydrophilic membrane.

15. The test device made by the method of claim 1.

* * * * *